United States Patent [19]

Iwama et al.

[11] 4,404,849

[45] Sep. 20, 1983

[54] METHOD AND SYSTEM FOR CORRECTING ERRORS OF MEASUREMENT IN TIRE UNIFORMITY INSPECTING MACHINES

[75] Inventors: Atsuaki Iwama; Yoshimata Maikuma, both of Kobe; Masayoshi Okamoto, Kakogawa; Toshikazu Tanaka, Ashiya; Yuji Oikawa, Kobe, all of Japan

[73] Assignee: Kabushiki Kaisha Kobe Seiko Sho, Kobe, Japan

[21] Appl. No.: 351,514

[22] Filed: Feb. 23, 1982

[30] Foreign Application Priority Data

Feb. 26, 1981 [JP] Japan .................................. 56-29017

[51] Int. Cl.³ .......................................... G01M 17/02
[52] U.S. Cl. ...................................................... 73/146
[58] Field of Search ................... 73/146, 8, 1 R, 117, 73/1 B, 462

[56] References Cited

U.S. PATENT DOCUMENTS 4,223,386 9/1980 Maruyama et al. .................. 73/462

Primary Examiner—Donald O. Woodiel
Attorney, Agent, or Firm—Oblon, Fisher, Spivak, McClelland & Maier

[57] ABSTRACT

A method for correcting errors of measurement due to variations in tire pressure in a tire uniformity inspecting operation, wherein a tire is inflated and rotated between a pair of rims and a load wheel is pressed against the tire and a radial force variation of said tire is measured, including: detecting a deviation of actual air pressure of the tire from a predetermined measuring pressure level to determine a correction coefficient; calculating a value of tire uniformity from the measured value of radial force variation according to the predetermined measuring pressure level; multiplying the calculated value of uniformity by the correction coefficient to compensate for any erroneous component due to a variation in the tire pressure.

4 Claims, 3 Drawing Figures

METHOD AND SYSTEM FOR CORRECTING ERRORS OF MEASUREMENT IN TIRE UNIFORMITY INSPECTING MACHINES

BACKGROUND OF THE INVENTION

(1) Field of the Invention

This invention relates to a method and a system for correcting errors of measurement which occur in tire uniformity inspection due to variations in the internal air pressure of a tire under inspection, by detecting a deviation of actual internal air pressure of a tire from a preset measuring pressure level to determine a correction coefficient from the value of deviation and multiplying an actually measured value of uniformity by the correction coefficient to wipe out the error of uniformity measurement due to a variation of the internal air pressure of the tire.

(2) Description of the Prior Art

According to the experiences and experiments in the past, a deviation $\Delta P$ kgf/cm$^2$ of a tire pressure from a predetermined measuring pressure level can have a large influence on the components of tire uniformity (mainly on RFV). For example, it is known that a deviation of 0.1 kgf/cm$^2$ from a predetermined tire pressure causes a variation of 0.5 kgf in the measurement of a standard passenger car tire with a uniformity component at the level of 10 kgf. The variation occurs in different degrees depending upon the level of the uniformity component as shown in FIG. 3 which exemplifies tires of certain sizes.

The conventional tire uniformity inspecting machines usually have a precision reducing valve 1 provided in a main pneumatic circuit 2 as shown in FIG. 1 for maintaining a tire pressure with an extremely high stability. The pressure reducing valve 1 is capable of maintaining a given tire pressure with a stability on the order of 1/1000 kgf/cm$^2$ as long as feed air is clean and it receives good maintenance and service. However, depending upon the degree of contamination or the moisture content of the feed air and the condition of maintenance, it easily loses stability, consequently giving rise to errors in the measured values of uniformity which are attributable to variations in the tire pressure.

In a tire uniformity inspecting machine, a tire 5 to be inspected is securely gripped between and rotated by a pair of upper and lower rims 3 and 4, while a load wheel 7 which is supported between a pair of load cells 6 is pressed against the rotating tire to measure variations in the radial force, namely, the uniformity of the tire. In such a uniformity measuring operation, it has been the conventional practice to control (or adjust) the tire pressure by the reducing valve 1, reading the pressure level on a pressure gauge 8 and supplying or discharging air by means of an electromagnetic change-over valve 9. The plant air (normally having a pressure level of 5-7 kg/cm$^2$) which serves as an air source is reduced to a predetermined uniformity measuring pressure level (normally to 2 kgf/cm$^2$) by the reducing valve 1. However, if moisture or dust deposits on the nozzle portion or valve seat of the pressure adjusting mechanism of the reducing valve 1, the measuring air pressure becomes unstable, as a result causing errors to the measured value of uniformity of the tire 7. According to the conventional procedure, a deviation of the uniformity measuring pressure from a predetermined pressure level due to malfunctioning of the reducing valve can be corrected only when the pressure level is constantly watched by an operator. However, in actual operations, the uniformity inspecting machine is used on a production line without constant watching of the tire pressure, accepting erroneous values of measurement in the absence of suitable correcting means.

SUMMARY OF THE INVENTION

With the foregoing situations in view, the present invention has as its object the provision of a method for measuring tire uniformity correctly should there occur some variations in the inner air pressure of a tire during inspection, and a system for carrying out the method.

According to one aspect of the present invention, there is provided a method for correcting errors of measurement due to variations in tire pressure in a tire uniformity inspecting operation in which a tire is inflated and rotated between a pair of rims and a load wheel is pressed against the tire to measure radial force variation of said tire, including: detecting a deviation of actual air pressure of the tire from a predetermined measuring pressure level to determine a correction coefficient; calculating a value of uniformity of the tire from the measured value of radial force variation according to the predetermined measuring pressure level; multiplying the value of uniformity by the correction coefficient to set off an erroneous component due to a variation in the tire pressure if any.

According to another aspect of the present invention, there is provided a system for correcting errors of measurement due to variations in tire pressure in a tire uniformity inspecting operation in which a tire is inflated and rotated between a pair of rims and a load wheel is pressed against the rotating tire to measure radial force variation of the tire, including: an arithmetic unit for calculating a deviation of actual air pressure of the tire from a predetermined measuring pressure level to determine a correction coefficient; a uniformity calculator for calculating a value of uniformity of the tire from actually measured radial force variation according to the predetermined measuring pressure level; and a multiplier for multiplying the value of uniformity by the correction coefficient to set off an erroneous component due to a variation in the tire pressure if any.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF PREFERRED EMBODIMENTS

Figure 1:
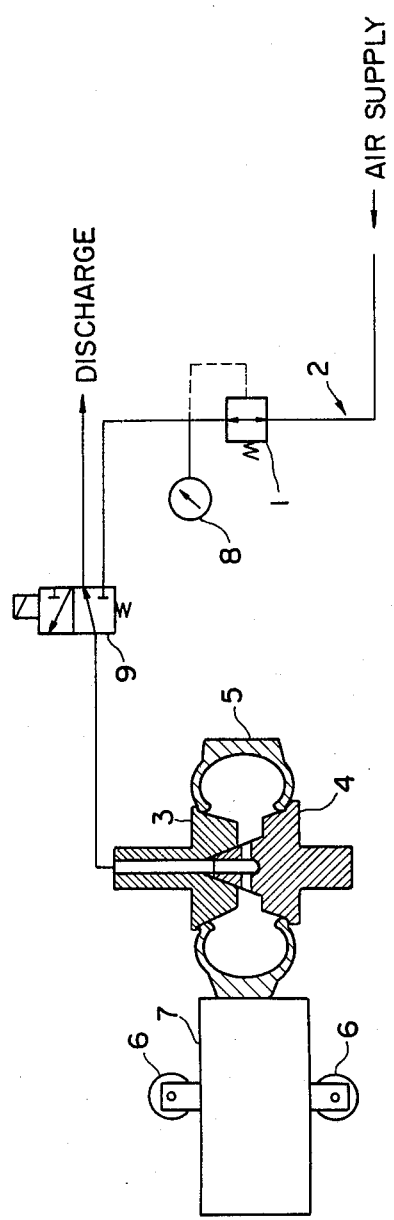
FIG. 1 is a diagrammatic illustration of conventional tire uniformity inspection.
Figure 2:
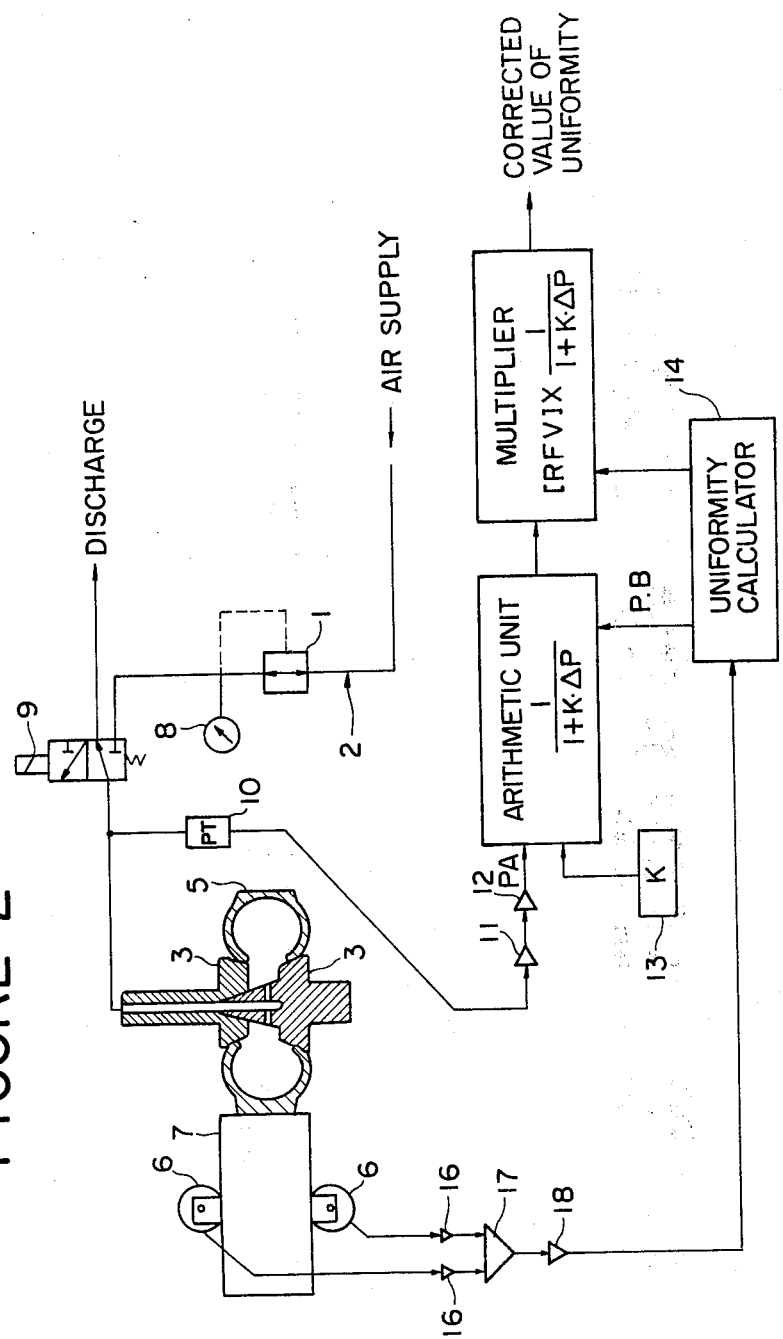
FIG. 2 is a diagrammatic illustration of an embodiment of the present invention.
Figure 3:
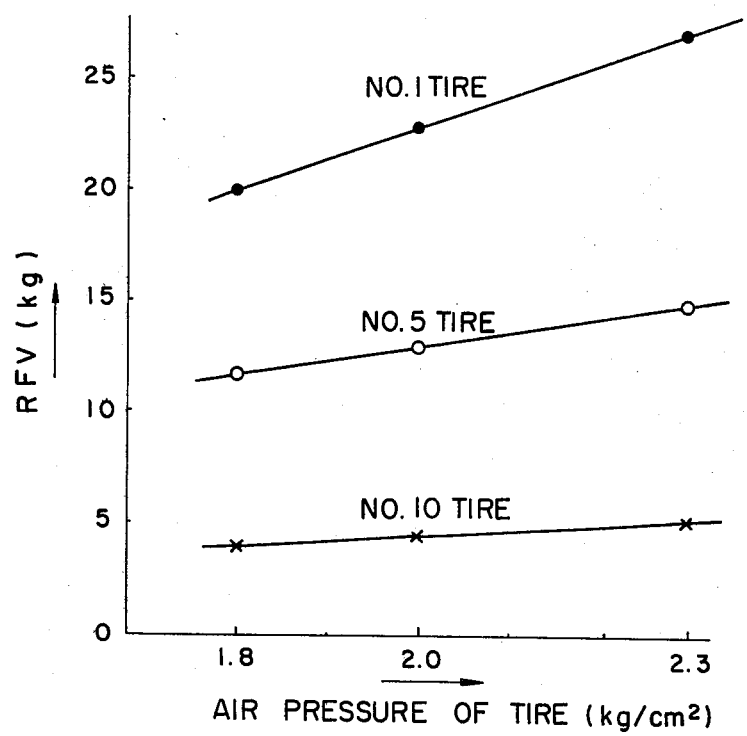
FIG. 3 is a graph showing variations in RFV in relation with tire pressure.

Referring now to the drawings, wherein like reference numerals designate identical or corresponding parts throughout the several views, and more particularly to FIG. 2 thereof, denoted at 10 is an electropneumatic transformer which produces an electric signal indicating the actual internal air pressure of a tire. The thus produced electric signal is passed through an amplifier 11 and a low-pass filter 12 for amplification and stabilization, and fed to an arithmetic operation circuit 15 along with an output signal of a separately provided coefficient setting unit 13 and an output signal of a uniformity calculator 14 corresponding to a preset measuring pressure level. On the other hand, output signals of a pair of load cells 6 are separately amplified by amplifiers 16 and summed up by an adder 17, and, after being passed through a low-pass filter 18 for stabilization, fed to the uniformity calculator 14 to obtain the value of uniformity on the basis of actually measured values (RFV), which corresponds to the preset measuring pressure level. The arithmetic operation circuit 15 computes the deviation of the actually measured tire pressure $P_A$ from the preset measuring pressure $P_B$, that is to say, a pressure deviation of $\Delta P = P_B - P_A$. The pressure deviation is multiplied by an coefficient K from the coefficient setting unit 13, computing an error correction coefficient $$\frac{1}{1 + K \cdot \Delta P}.$$

This error correction coefficient and the value of uniformity obtained by the uniformity calculator 14 are fed to and multiplied by the multiplier 19 to remove the erroneous component which is caused by the deviation of the tire pressure from the preset level.

The error correction by the present invention is now illustrated by more specific examples. According to the results of our experiments, in a case where uniformity of a tire having a size of 165SR-13 is inspected by measuring the radial force variation (RFV), maintaining an internal air pressure of 2.0 kgf/cm² under a load of 330 kgf, a tire pressure increase of 0.1 kgf/cm² results in an increase of 0.5 kgf in the value of RFV if the rated RFV of the tire is about 10 kgf. It has also been revealed that a reduction of about 0.5 kgf is caused to the RFV value by a tire pressure drop of 0.1 kgf/cm². In this case, the constant K which represents the influence of the air pressure on RFV varies depending upon the level of RFV and can be expressed as $$\frac{\Delta RFV}{\Delta P} / RFV = \frac{0.5}{0.1} / 10 = 0.5.$$

Although the constant K varies according to the kind of the tire, it takes the same value with regard to the tires of the same kind. Now, assume that the level of RFV for a certain tire is 10 kgf at an air pressure of 2.0 kgf/cm² and it shows an RFV value of 10.5 kgf at an increased air pressure of 2.1 kgf/cm when measured by a uniformity machine which is installed in a production line. According to the conventional procedure, the tire is judged as having an RFV value of 10.5 kgf although its actual RFV value is 10 kgf. However, according to the present invention taking into account the difference between the predetermined measuring pressure level and the actual pressure reading, the pressure deviation $\Delta P = 0.1$ kgf/cm², that is to say, the difference between the preset measuring pressure level 2.0 kgf/cm² and the actual pressure level 21 kgf/cm² is detected for necessary correction, substituting the constant K and detected pressure deviation $\Delta P = 0.1$ kgf/cm² into the correction coefficient $$\frac{1}{1 + K\Delta P}$$

and multiplying the measured RFV value = 10.5 kgf by the correction coefficient $$\frac{1}{1 + 0.5 \times 0.1} = 0.952.$$

Thus, the corrected RFV value is $10.5 \times 0.952 = 10.0$ kgf which is the actual RFV value of the tire, not prejudiced by the deviation from the predetermined measuring pressure.

As clear from the foregoing description, according to the present invention, the deviation of the actual air pressure of a tire from a preset level is calculated to determine a correction coefficient and the actually measured value of uniformity of the tire is multiplied by the correction coefficient to correct errors of measurement due to variations in the tire pressure, permitting uniform measurement free of errors even if the internal air pressure of a tire loses stability. Since the preset reference pressure level is be obtained from the uniformity calculator, the present invention can be realized by a very simple system arrangement.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for correcting errors of measurement due to variations in tire pressure in a tire uniformity inspecting operation, wherein a tire is inflated and rotated between a pair of rims, a load wheel is pressed against the tire, and a radial force variation of the tire is measured, said method comprising:
    detecting a deviation of actual air pressure of said tire from a predetermined measuring pressure level to determine a correction coefficient;
    calculating a value of tire uniformity from the actually measured value of radial force variation of said tire according to the predetermined measuring pressure level; and
    multiplying the calculated value of uniformity of said tire by said correction coefficient to compensate for any erroneous component due to a variation in the tire pressure.

2. A method as set forth in claim 1, wherein said correction coefficient is expressed by $$\frac{1}{1 + K\Delta P}$$

wherein K is a constant predetermined based on the influence of air pressure on the value of radial force variation and $\Delta P$ is a detected pressure deviation from said preset measuring pressure level.

3. A system for correcting errors of measurement due to variations in tire pressure in a tire uniformity inspecting operation, wherein a tire is inflated and rotated between a pair of rims, a load wheel is pressed against the rotating tire, and a measuring device provided to measure a radial force variation of said tire, said system comprising:

an arithmetic unit for calculating a deviation of actual air pressure of said tire from a predetermined measuring pressure level to determined a correction coefficient;

a uniformity calculator for calculating a value of tire uniformity from the actually measured radial force variation according to said predetermined measuring pressure level; and a multiplier for multiplying the calculated value of uniformity by said correction coefficient to compensate for any erroneous component due to a variation in the tire pressure.

4. A system as set forth as in claim 3, wherein said correction coefficient is expressed by $$\frac{1}{1 + K\Delta P}$$

where K is a constant predetermined based on the influence of air pressure on the value of radial force variation of said tire and $\Delta P$ is a calculated pressure deviation from said predetermined measuring pressure level.

* * * * *